Nov. 29, 1955 J. B. ATWOOD 2,725,467

GATE CONTROL CIRCUIT

Filed Sept. 12, 1951 2 Sheets-Sheet 1

INVENTOR
John B. Atwood
BY
Charles H. Brown
ATTORNEY

INVENTOR
John B. Atwood
BY
Charles H. Brown
ATTORNEY 2,725,467

GATE CONTROL CIRCUIT

John B. Atwood, Riverhead, N. Y., assignor to Radio Corporation of America, a corporation of Delaware Application September 12, 1951, Serial No. 246,311

3 Claims. (Cl. 250—20)

This invention relates to gate control circuits, and more particularly to gate control circuits useful in connection with diversity receivers for radio telegraphy or other forms of radio communication.

For the sake of convenience, this invention will be described in connection with radiotelegraph diversity receivers. However, it is to be understood that it is equally applicable to diversity receivers for other types of radio communication.

The present invention constitutes an improvement over my joint Patent #2,515,668, dated July 18, 1950. In said patent, two gate tubes or gating devices having a common output circuit, and respectively supplied with detected signals from the two diversity receivers, are alternatively opened to feed the signal from one receiver or the other to the output circuit, depending on which of the two signals is the stronger. In order to open these gates alternatively, or, in other words, to permit the gate tubes to conduct alternatively and also to switch the gates when the gated-off signal becomes stronger than the then-gated-on signal, a gate control circuit is utilized. In the aforementioned patent, the gate control circuit disclosed includes a trigger driver tube (energized by the output of a differential rectifier circuit, in turn supplied with intermediate frequency signals from the two diversity receivers) for driving a two-stage locking circuit or double-trigger circuit, the second stage of which in turn controls the two gate tubes. Such a gate control circuit as that just described and as disclosed in the above-mentioned patent will operate very nicely. However, such an arrangement which includes a trigger driver tube followed by two trigger circuits, is a little complicated.

Accordingly, an object of this invention is to provide an improved and simplified gate control system for diversity receivers, which requires a smaller number of circuit components than that disclosed in the above-mentioned patent.

Another object is to devise a novel gate control circuit for diversity receivers.

The foregoing and other objects of the invention will be best understood from the following description of some exemplifications thereof, reference being had to the accompanying drawings, wherein.

The objects of this invention are accomplished, briefly, in the following manner: A separate unilaterally-conducting device is connected between the keying grid and cathode of each of the gate tubes and across each of these devices is connected a separate resistor. The output leads of a differentially-connected rectifier (to the input of which are supplied signals from the diversity receivers) are connected to the #1 or keying grids of the respective gate tubes, while the detected signals from the diversity receivers themselves are supplied to the control grids of the respective gate tubes. When the amplitude of the signal from one diversity receiver exceeds the other or others, current flows through its corresponding unilateral device and through the resistors which are in the keying grid biasing circuits of the remaining gate tubes, so that the gate tube corresponding to said one receiver is opened and the gate tubes corresponding to the remaining receivers are biased off or closed. When the amplitudes of all signals from the diversity receivers are equal, it is possible for all the gate tubes to simultaneously conduct or be open. In a modification, two gate tubes arranged in push-pull are used for each receiver and the signals bein gated are at intermediate frequency. The invention is disclosed as being applicable to either two-receiver or three-receiver diversity.

This invention is particularly applicable to diversity receivers for receiving frequency shift signals. Frequency shift signals may be considered frequency modulation signals because in these signals marking characters may be represented by current of one frequency and spacing characters by current of a frequency separated from said one frequency by several hundred cycles, more or less.

Figure 1:
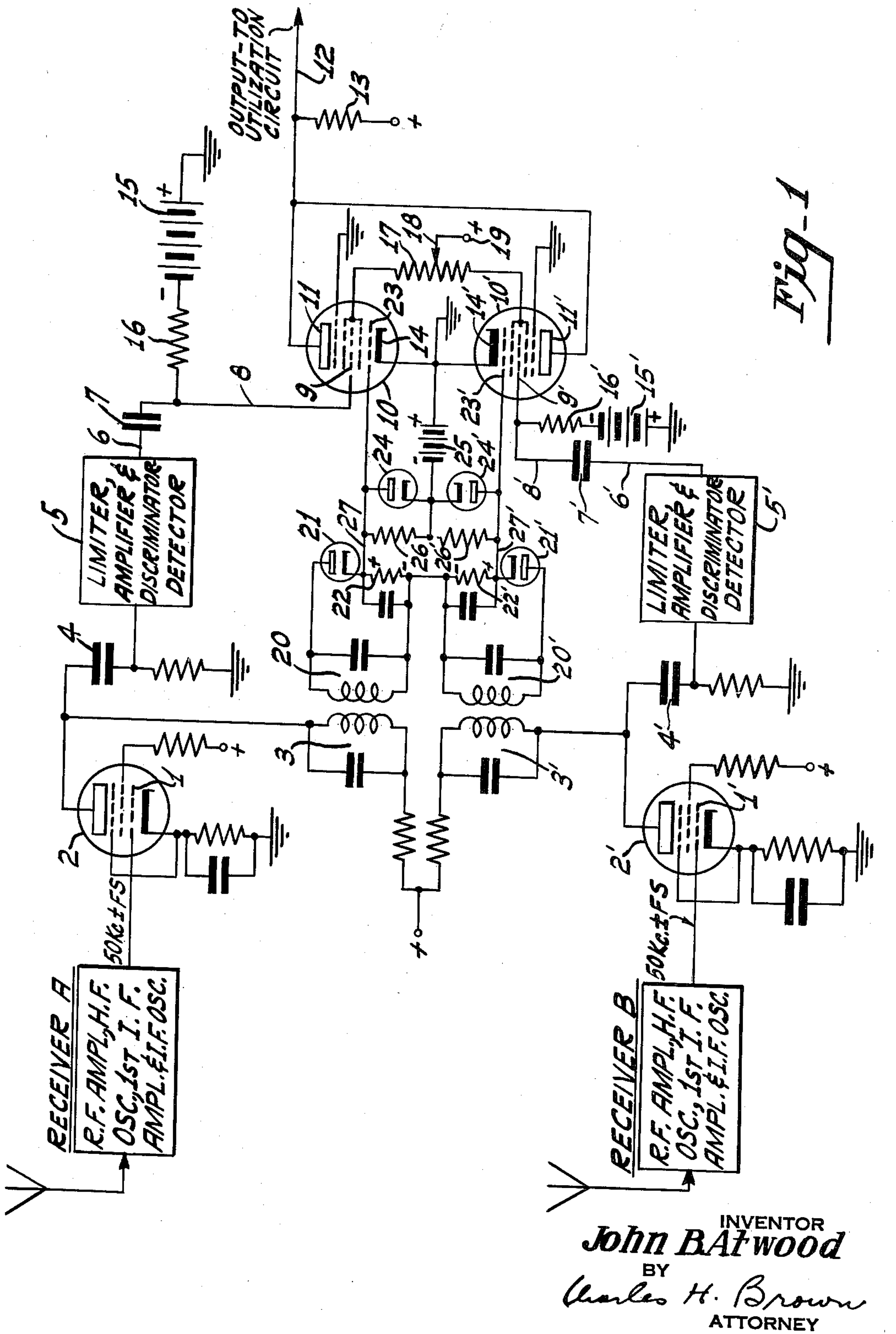
Fig. 1 illustrates an embodiment of this invention as applied to two-receiver or two-set diversity switching.

In Fig. 1, the application of this invention to a two-receiver diversity gate tube system is illustrated. Referring to this figure, two receivers A and B, arranged in diversity with respect to the transmitted signals so as to receive different versions thereof, are assumed to be supplying outputs at 50 kc.±FS to the respective control grids 1 and 1′ of the amplifier pentode vacuum tubes 2 and 2′. The receivers may be arranged in space diversity, polarization diversity, or any other form of diversity with respect to a remote transmitter. Each receiver may include, as illustrated in Fig. 1, a radio frequency amplifier wherein the wave energy is received and amplified. Each receiver may also include a high frequency heterodyning oscillator (a common oscillator may be used) and a mixer for converting the wave energy to intermediate frequency, followed by a first intermediate frequency amplifier and an intermediate frequency oscillator and converter for converting the wave energy to an intermediate frequency of 50 kc. center frequency. The output of each receiver may be at say 50 kc.±the frequency shift FS. The invention as hereinbefore stated is particularly adapted to frequency modulation of the type known as frequency shift telegraphy, in which case the 50 kc. intermediate frequency is shifted from one frequency representing mark (high frequency) to another frequency representing space separated from the first frequency by several hundred cycles.

In the description which follows, only one channel will be described in detail for the sake of brevity and simplicity. Corresponding reference numerals will be used insofar as possible in both channels to designate corresponding circuit components, the reference numerals being primed in the receiver B channel.

The 50 kc.±FS output energy from receiver A is fed to the control grid 1 of a second intermediate frequency amplifier stage tube 2 for amplification therein. The tube 2 is connected substantially conventionally, having the usual cathode resistor and capacitor unit and screen grid dropping resistor, etc. The anode of tube 2 is coupled to a circuit 3 tuned to parallel resonance substantially at 50 kc. In practice this circuit is tuned in such a fashion as to provide a flat bandpass characteristic wide enough to assure no frequency discriminating action for the frequencies passed. The low radio frequency potential end of this circuit is connected through a resistor to the positive terminal of a source of unidirectional potential, as shown. Amplified intermediate frequency energy is also supplied from the anode of tube 2 by a coupling capacitor 4 to the input side of a unit 5 which includes a full-wave limiter which amplifies and limits in a full-wave manner the signal fed thereto from tube 2. Following this, the signal is amplified in an amplifying stage in unit 5 and then fed to a discriminator-detector in such unit. The limiter, amplifier and discriminator-detector in unit 5 are preferably of the type disclosed in Fig. 2 of Patent No. 2,515,668, previously referred to. The lead 6 couples the output of the discriminator-detector of unit 5 through a coupling capacitor 7 and lead 8 to the control grid 9 (grid #3) of an electronic gate tube 10, which is preferably a pentagrid vacuum tube. Tube 10 may be termed an electronic valve, an electronic gating valve, an electron control device, an electrode structure, or a gate tube. The potential on lead 6 varies from positive to negative direct current substantially symmetrically about zero potential in accordance with the keying of the signal being received; thus, one potential represents mark interval (when the received signal is at mark frequency) and the other represents space interval (when the received signal is at space frequency).

Similarly, the lead 6′ couples the output of the discriminator-detector of unit 5′ (which is in turn supplied with amplified intermediate frequency energy from receiver B through amplifier tube stage 2′) through capacitor 7′ and lead 8′ to the control grid 9′ of gate tube 10′, which is a pentagrid vacuum tube. The anodes 11 and 11′ of the respective gate tubes 10 and 10′ are connected directly together and to a common output lead 12, which feeds the combined output of tubes 10 and 10′ to a suitable utilization circuit. The utilization circuit may, for example, be the same as that coupled to the output of the two gate tubes in Patent #2,515,668. When gate tube 10 is conductive, the detected signal derived from receiver A is impressed on lead 12 and on the common utilization circuit. When gate tube 10′ is conductive, the detected signal derived from receiver B is impressed on lead 12 and on the common utilization circuit. Of course, when both tubes 10 and 10′ are conductive, as can happen with this invention, the detected signals derived from both receivers A and B are impressed on lead 12 and the common utilization circuit. The anodes 11 and 11′ are both supplied with potential, from the positive terminal of a source of unidirectional potential, through a resistor 13 which has a high value of resistance as compared to the plate resistance of the gate tubes 10 and 10′, which may be of the type known as 6SA7, for example.

The cathodes 14 and 14′ of respective tubes 10 and 10′ are grounded. In order to supply the proper negative operating bias to grid 9, the negative terminal of a source 15 of unidirectional potential is coupled through a resistor 16 to lead 8 and grid 9. The positive terminal of source 15 is grounded. The grid 9′ is negatively biased in a similar way. The second grids of tubes 10 and 10′ are connected together by the resistance of a potentiometer 17. A tap on this resistance is connected by lead 18 to a terminal 19 which is connected to a suitable voltage regulated positive point on the direct current supply source. The potentiometer including resistor 17 forms means for balancing the operation of the gate tubes 10 and 10′. By means of the gate balance adjustment the voltage drop across the common output lead of the tubes 10 and 10′, i. e., across resistor 13, may be made the same (with no signal applied) regardless of which gate tube is conducting.

My improved and simplified arrangement for selecting the best signal by opening the particular gate tube 10 or 10′ which is excited by the receiver having the best signal will now be described. The intermediate frequency signal amplified by tube 2 appears as stated before in the tuned circuit 3 and this circuit includes a winding forming the primary of a transformer having a secondary winding in a tuned circuit 20 coupled in shunt to the impedance constituted by the diode 21 and its load resistance 22. The diode 21 may be in a separate envelope as shown or it may be in a double diode envelope with diode section 21′. The other diode section 21′ and its load resistance 22′ are similarly coupled to the secondary winding of tuned circuit 20′, fed with the intermediate frequency signal which is amplified by tube 2′. The transformers of circuits 20 and 20′ have a pass band wide enough to assure no frequency discriminating action at the frequencies passed. The currents passed by these transformers are to be compared as to magnitude to derive the gate control action. Resistors 22 and 22′ may each have a value of 150,000 ohms, for example, while the capacitors across these resistors may each have a value of 0.001 microfarad.

The load resistors 22 and 22′ are connected in series, and together with diodes 21 and 21′ constitute a differential rectifier circuit or differential detector system. The differential detectors produce across resistors 22 and 22′ potentials which depend on the respective signal strengths. A connection devoid of concentrated impedance extends from the cathode of diode 21 directly to the keying grid 23 (grid #1) of gate tube 10. Similarly, a connection devoid of concentrated impedance extends from the cathode of diode 21′ directly to the keying grid 23′ of gate tube 10′. A unilaterally-conducting device 24, for example a diode vacuum tube, is connected between grid 23 and the negative terminal of a source 25 of unidirectional current, the positive terminal of which is grounded, as are cathodes 14 and 14′. A resistor 26 having a rather large value of resistance, such as one megohm, is connected directly in parallel across the two electrodes of diode 24. This resistor allows the proper negative operating or fixed grid-cathode bias to be applied to grid 23 from source 25. Device 24 is so poled as to provide a path of low impedance to the flow or current from grid 23 downward toward the negative terminal of source 25, but of high impedance to the flow of current in the opposite direction.

Similarly, a unilaterally-conducting device 24′, for example a vacuum diode, is connected between grid 23′ and the negative terminal of source 25. A resistor 26′, for example of one megohm, is connected directly in parallel across the two electrodes of diode 24′. Resistors 26 and 26′ are entirely separate and distinct from each other. This resistor allows the proper negative operating or fixed grid-cathode bias to be applied to grid 23′ from source 25. Device 24′ is so poled as to provide a path of low impedance to the flow of current from grid 23′ upward toward the negative terminal of source 25, but of high impedance to the flow of current in the opposite direction. Looked at in another way, between grids 23 and 23′ are placed two diodes 24 and 24′ connected back-to-back, as well as two resistors 26 and 26′ connected in series. The anode of diode 24 is connected to grid 23 and the anode of diode 24′ is connected to grid 23′.

Now, assume that the signal in receiver A is stronger than that in receiver B. The polarities developed by the diode-rectified signals are indicated adjacent load resistors 22 and 22′. If receiver A signal is stronger than receiver B signal, then the voltage on lead 27 (connected to the cathode of diode 21) will be positive with respect to that on lead 27′ (connected to the cathode of diode 21′), since under these conditions the voltage developed across resistor 22 will be greater than that developed across resistor 22′. Current will then flow from lead 27 through diode 24 and through resistor 26′ to lead 27′. The impedance of device 24 is very low for current flow in this direction while that of device 24′ is extremely high for current flow in this direction (from lead 27 to lead 27′). Neglecting the small voltage drop across diode 24, the entire differential voltage developed by the differential rectifier 21, 21′, etc. plus the potential of source 25 is applied across resistor 26′ which is in the keying grid circuit of gate tube 10′. The voltage drop across resistor 26′ due to the current flowing therethrough is in such a direction as to be in series-aiding relationship to the potential of source 25, between grid 23′ and cathode 14′. The algebraic sum of these two voltages provides a rather high negative voltage on keying grid 23′ which is sufficient to key gate tube 10' off or to close this gate. Detected signal from receiver B is thus cut off from output 12.

Grid 23 of gate tube 10 is biased under these conditions by the potential of source 25 minus the voltage drop across diode 24, since the voltage drop across this diode due to the current flowing therethrough is in a direction such as to be in series-opposing relationship to the voltage of source 25, between grid 23 and cathode 14. The negative potential of source 25 is itself insufficient to bias off the gate tubes and this potential is reduced (insofar as the bias on grid 23 only is concerned) by the voltage drop across diode 24 which, although small, is greater than zero. Therefore, under these conditions gate tube 10 is not keyed off or biased to cutoff but instead is held open to pass detected signal derived from receiver A to the output circuit 12.

Next, assume that the signal in receiver B becomes stronger than that in receiver A. Under these conditions the voltage on lead 27' will be positive with respect to that on lead 27 since now the voltage developed across resistor 22' will exceed that developed across resistor 22. Current will then flow from lead 27' through diode 24' and through resistor 26 to lead 27. The impedance of device 24' is very low for current flow in this direction while that of device 24 is extremely high for current flow in this direction (from lead 27' to lead 27). Neglecting the small voltage drop across diode 24', the whole differential voltage plus the potential of source 25 is applied across resistor 26 in the keying grid circuit of gate tube 10. The algebraic sum of the voltage drop across resistor 26 and the potential of source 25 provides a high enough negative voltage on keying grid 23 to cut off gate tube 10 or to close this gate. Detected signal from receiver A is thus cut off from output 12. Gate tube 10' is allowed to conduct under these conditions, its grid 23' being biased only by the potential of source 25 minus the voltage drop across diode 24'; this resultant bias potential is insufficient to cut off tube 10'. Therefore, gate tube 10' is now held open to pass detected signal derived from receiver B to the output circuit 12.

In the gate control circuit of this invention, it is possible for both gates to conduct, when the outputs of the receivers A and B are of the same amplitude, since under these conditions there will be no flow of current through either of the resistors 26 or 26' to provide a cutoff biasing voltage for either of the gate tubes 10 or 10'. However, if the common load resistor 13 for the gate tubes has a high value of resistance as compared to the plate resistance of the tubes, the change in the output level of the gates when both gates conduct (as compared to the output level when only one gate is conducting) will be small.

Figure 2:
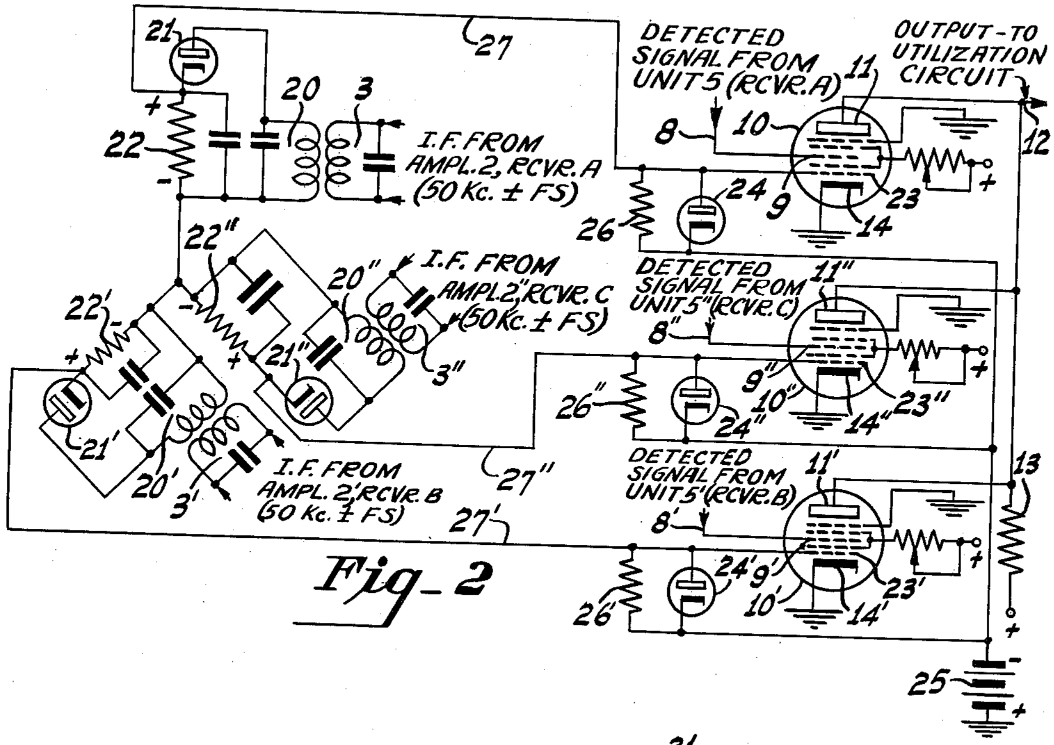
Fig. 2 shows a gate control circuit similar to Fig. 1 but arranged for three-receiver diversity.

Fig. 2 illustrates a gate control circuit similar to that of Fig. 1, but arranged for three-set or three-receiver diversity. For this arrangement, three receivers A, B and C are provided, arranged in diversity so that each receiver picks up a different version of the transmitted signal. The same reference numerals as in Fig. 1 are used for similar elements in Fig. 2. Also, in Fig. 2 similar elements in the three channels A, B and C are denoted by the same numerals, the numerals being single primed for channel B and double primed for channel C. In Fig. 2, the intermediate frequency signal from each receiver is applied to a separate corresponding diode 21, 21' or 21''. These diodes are connected in a differential rectifier arrangement quite similar to that of Fig. 1, except that in Fig. 2 the arrangement is three-pronged or star-shaped because of the three rectifiers 21, 21' and 21''. The rectifier load resistors 22, 22' and 22'' are connected differentially and to a common point, so that when receiver A has the strongest signal the voltage on lead 27 will be positive with respect to those on leads 27 and 27''. When receiver B has the strongest signal the voltage on lead 27' will be positive with respect to those on leads 27 and 27'', while when receiver C has the strongest signal the voltage on lead 27'' will be positive with respect to those on leads 27 and 27'.

Three gate tubes 10, 10' and 10'' are provided, the detected signal from each receiver A, B and C being fed to a respective control grid 9, 9' or 9'' in the corresponding gate tube. Leads 27, 27' and 27'' are connected to the respective keying grids 23, 23' and 23'' of the keying tubes. Respective unilaterally conducting devices 24, 24' and 24'', poled the same way as in Fig. 1, are connected between the respective keying grids 23, 23' and 23'' and the negative terminal of biasing source 25. Respective resistors 26, 26' and 26'' are connected across the corresponding devices 24, 24' and 24''. Finally, the three anodes 11, 11' and 11'' of gate tubes 10, 10' and 10'' utilize a common anode load resistor 13 and are connected to a common output circuit 12.

The operation of Fig. 2 is similar to that of Fig. 1, except that in Fig. 2 the strongest signal version will cut off the other two versions from the common output circuit, by cutting off or closing their gate tubes. More particularly, suppose that the signal version of receiver A is stronger than those of receivers B and C. Then, the voltage on lead 27 will be positive with respect to those on leads 27' and 27''. Current will then flow from lead 27 through diode 24 and through resistor 26' to lead 27', the voltage developed across resistor 26' combining with the potential of source 25 to bias off or cut off tube 10', closing this gate. Current will also flow from lead 27 through diode 24 and through resistor 26'' to lead 27'', the voltage developed across resistor 26'' combining with the potential of source 25 to bias off or cut off tube 10'', closing this gate. Under these conditions, only gate 10 is open and only the signal version of receiver A gets to the common output 12.

By analogous action, when the signal version of receiver B is the strongest gate 10' will be open and gates 10 and 10'' will be closed or cut off so that the receiver B version, only, will be fed to the common output 12; also, when the receiver C version is the strongest only gate 10'' will be open and gates 10 and 10' will be closed or cut off so that the receiver C version, only, will be fed to the common output 12.

In Fig. 2, like in Fig. 1, it is possible for two gates or even all three gates to be opened at once, when the outputs of two or all three receivers have the same amplitude.

Figure 3:
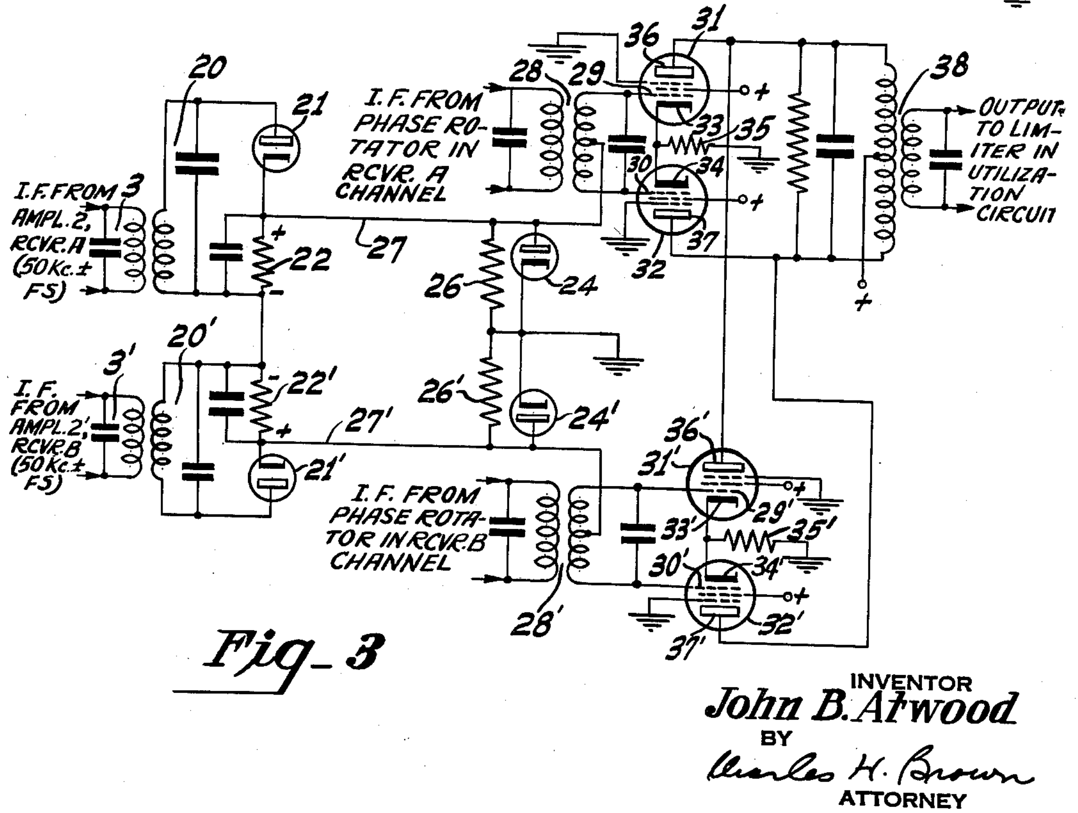
Fig. 3 is a schematic representation of a modification of Fig. 1.

Fig. 3 illustrates a modification of the control circuit of Fig. 1 (that is, a two-receiver gating control arrangement), using a somewhat different gating circuit. In Fig. 3, those parts which are the same as those of Fig. 1 are given the same reference numerals. In this figure, gating is carried out at intermediate frequency, which in my example may be 50 kc. Each of the two receiver channels A and B is provided with a separate electronic phase rotator, in order to hold the two intermediate frequency signals in phase at the gate tubes when diversity switching from one gate to the other occurs. Suitable phase rotators for this purpose are disclosed in my prior copending application, Serial No. 221,184, filed April 16, 1951, now Patent No. 2,678,385, dated May 11, 1954. These phase rotators must be used in this arrangement since gating is carried out at intermediate frequency—that is, since intermediate frequency signals from the two diversity receivers are selectively gated to a common output circuit and complete cancellation would occur if the two I. F. signals should be 180° out of phase and of equal amplitude as might be the case when both gates are open simultaneously.

The intermediate frequency output signal, 50 kc.±FS, from the phase rotator in the receiver A channel is fed to the primary of an intermediate frequency transformer 28 which has a tuned secondary the opposite ends of which are connected to respective control grids 29 and 30 of a pair of push-pull-connected vacuum tubes 31 and 32. Tubes 31 and 32 are preferably of the type known as 6SH7. These tubes are sharp-cutoff pentodes, providing an improved control action. Lead 27 provides control grid bias for tubes 31 and 32 by its connection to the midpoint of the secondary of transformer 28. In this case, the respective cathodes 33 and 34 of tubes 31 and 32 are connected to ground through a resistor 35. In Fig. 3, diode 24 and its parallel resistor 26, instead of being connected between lead 27 and the negative terminal of a battery 25 as in Fig. 1, are connected between lead 27 and ground.

The respective anodes 36 and 37 of tubes 31 and 32 are connected to opposite ends of the tuned primary winding of an output transformer 38, the tuned secondary of which is connected to the input of a limiter in a suitable utilization circuit which preferably includes, following the limiter, a discriminator-detector and a tone keyer, which may be arranged somewhat as disclosed in Fig. 2 of Peterson Patent #2,553,271.

Similarly, the intermediate frequency output signal from the phase rotator in the receiver B channel is fed to the primary of intermediate frequency transformer 28' opposite ends of the secondary of which are connected to respective control grids 29' and 30' of two push-pull-connected vacuum tubes 31' and 32'. These tubes are also preferably of the 6SH7 type. Lead 27' provides control grid bias for tubes 31' and 32' by its connection to the midpoint of the secondary of transformer 28'. The cathodes 33' and 34' are both connected to ground through resistor 35'. Diode 24' and its parallel resistor 26' are connected between lead 27' and ground. Anode 36' is connected directly to anode 36 and anode 37' is connected directly to anode 37.

The operation of the Fig. 3 circuit is quite similar to that of Fig. 1, previously described. Assuming that the signal in receiver A is stronger than that in receiver B, the voltage on lead 27 will be positive with respect to that on lead 27' and current will flow from lead 27 through diode 24 and through resistor 26' to lead 27'. Resistor 26' is in the grid-cathode circuit of tubes 31' and 32' (as can be clearly seen from an examination of Fig. 3), so that the voltage drop across resistor 26' is effective to bias these tubes, being of a polarity and magnitude to bias tubes 31' and 32' off, or to close these gates. Signal from receiver A then goes to the common output circuit, in push-pull fashion. Conversely, if the signal in receiver B is stronger than that in receiver A, current will flow through resistor 26 and the voltage drop across such resistor biases tubes 31 and 32 off, closing these gates and allowing signal from receiver B to go in push-pull fashion to the common output circuit. In the case where current flows through diode 24, the negative bias is removed from grids 29 and 30 and gates 31 and 32 are opened; when current flows through diode 24' the negative bias is removed from grids 29' and 30' and gates 31' and 32' are opened.

In the circuit of Fig. 3, only one limiter, discriminator and detector are required (two of these are required in Fig. 1 and three in Fig. 2) but common radio frequency and intermediate frequency oscillators are required and the signals in the two channels must be brought into phase when switching occurs, by means of the phase rotators. However, the Fig. 3 arrangement would also work satisfactorily if transformers 28, 28' and 38 are audio transformers and if transformers 28 and 28' are each fed the output of a separate limiter and discriminator-detector, supplied in turn from respective diversity receivers. Common oscillators would then not be required. The main drawback of such an arrangement would be the imposition of a minimum keying speed corresponding to the minimum keying speed which can be passed by the transformers.

What is claimed is:

1. In a diversity receiving system including a plurality of receivers arranged in diversified relation with respect to a remote transmitter, an electronic gating valve coupled to the output of each receiver and excited by the signal picked up by such receiver, each of said valves having therein a gating electrode, a source of unidirectional potential having its negative terminal connected to the gating electrodes to provide a negative bias thereon, a differential rectifier circuit including at least two output leads and receptive of signals from each receiver for comparing the relative strengths of the signals in each receiver and for producing a potential difference between such leads in response to a difference in strength between the signals being compared, the potential of one output lead relative to the potential of the other lead depending on which of the received signals is strongest, means directly coupling said output leads one to each respective gating electrode through connections devoid of concentrated impedance, a pair of unilaterally conducting devices serially connected directly between said gating electrodes and directly between said output leads, and a separate fixed impedance connected across each of said devices, a potential difference of one sense between said output leads causing a flow of current through one of said devices and the other of said impedances, the voltage drop thus developed across said other impedance being in series-aiding relationship to the negative bias provided by said source on the gating valve corresponding to said other impedance and the combination of said voltage drop and said negative bias operating to bias off said last-named valve.

2. In a diversity receiving system including two receivers arranged in diversified relation with respect to a remote transmitter, an electronic gating valve coupled to the output of each receiver and excited by the signal picked up by such receiver, each of said valves having therein a gating electrode, a source of unidirectional potential having its negative terminal connected to the gating electrodes to provide a negative bias thereon, a differential rectifier circuit including two output leads and receptive of signals from the two receivers for comparing the relative strengths of the signals in such receivers and for producing a potential difference between such leads in response to a difference in strength between the two signals being compared, the potential of one output lead relative to the potential of the other lead depending on which of the two received signals is stronger, means directly coupling said output leads one to each respective gating electrode through connections devoid of concentrated impedance, two unilaterally conducting devices serially connected directly between said gating electrodes and directly between said output leads, and a separate fixed impedance connected across each of said two devices, a potential difference of one sense between said output leads causing a flow of current through one of said devices and the other of said impedances, the voltage drop thus developed across said other impedance being in series-aiding relationship to the negative bias provided by said source on the gating valve corresponding to said other impedance and the combination of said voltage drop and said negative bias operating to bias off said last-named valve.

3. In combination, two sources of signals, an electronic gating valve coupled to the output of each source and excited by the signal output thereof, each of said valves having therein a gating electrode, a source of unidirectional potential having its negative terminal connected to the gating electrodes to provide a negative bias thereon, a signal comparison circuit having two output leads and receptive of signals from the two sources for comparing the relative strengths of such signals and for producing a potential difference between such leads in response to a difference in strength between the signals being compared, the potential of one lead relative to the potential of the other lead depending on which of the two signals is stronger, means directly coupling said output leads one to each respective gating electrode through connections devoid of concentrated impedance, a pair of unilaterally conducting devices serially connected directly between said gating electrodes and directly between said output leads, and a separate fixed impedance connected across each of said devices, a potential difference of one sense between said output leads causing a flow of current through one of said devices and the other of said impedances, the voltage drop thus developed across said other impedance being in series-aiding relationship to the negative bias provided by said source on the gating valve corresponding to said other impedance and the combination of said voltage drop and said negative bias operating to bias off said last-named valve.

References Cited in the file of this patent

UNITED STATES PATENTS

| | | |
|---|---|---|
| 2,488,193 | Hughes | Nov. 15, 1949 |
| 2,515,668 | Schock et al. | July 18, 1950 |
| 2,545,214 | Schock | Mar. 13, 1951 |
| 2,551,805 | McDonald | May 8, 1951 |
| 2,572,912 | Bucher | Oct. 30, 1951 |
| 2,619,587 | Trevor | Nov. 25, 1952 |